(12) United States Patent
Hirukawa et al.

(10) Patent No.: US 11,670,296 B2
(45) Date of Patent: Jun. 6, 2023

(54) VOICE PROCESSING SYSTEM, VOICE PROCESSING METHOD, AND STORAGE MEDIUM STORING VOICE PROCESSING PROGRAM

(71) Applicant: SHARP KABUSHIKI KAISHA, Sakai (JP)

(72) Inventors: Keiko Hirukawa, Sakai (JP); Yuuki Iwamoto, Sakai (JP); Satoshi Terada, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 212 days.

(21) Appl. No.: 17/179,662

(22) Filed: Feb. 19, 2021

(65) Prior Publication Data
US 2021/0287672 A1    Sep. 16, 2021

(30) Foreign Application Priority Data
Mar. 13, 2020  (JP) .............................. JP2020-043712

(51) Int. Cl.
*G10L 15/22*    (2006.01)
*G06F 3/16*    (2006.01)
*G10L 15/08*    (2006.01)
*G10L 15/32*    (2013.01)

(52) U.S. Cl.
CPC .............. *G10L 15/22* (2013.01); *G06F 3/165* (2013.01); *G06F 3/167* (2013.01); *G10L 15/083* (2013.01); *G10L 15/32* (2013.01); *G10L 2015/088* (2013.01); *G10L 2015/223* (2013.01)

(58) Field of Classification Search
CPC ......... G10L 15/22; G10L 15/01; G10L 15/04; G10L 15/06; G10L 15/08; G10L 15/083; G10L 15/18; G10L 15/1815; G10L 15/183; G10L 15/197; G10L 15/26; G10L 15/28; G10L 2015/0631–0638; G10L 2015/221–228; G10L 2015/085
USPC ...... 704/275, 270.1, 270, 26, 277, 243, 250, 704/255, 257
See application file for complete search history.

(56) References Cited

U.S. PATENT DOCUMENTS

| 5,226,090 | A  | * | 7/1993 | Kimura | ................... | G10L 15/22 |
| | | | | | | 704/E15.04 |
| 7,386,577 | B2 | * | 6/2008 | Arning | ................... | G06Q 10/06 |
| | | | | | | 707/703 |
| 11,410,646 | B1 | * | 8/2022 | Erbas | ...................... | G10L 15/02 |

FOREIGN PATENT DOCUMENTS

JP            2010-055375 A    3/2010

* cited by examiner

*Primary Examiner* — Qi Han
(74) *Attorney, Agent, or Firm* — ScienBiziP, P.C.

(57) ABSTRACT

A voice processing system includes a command specifier that specifies a command based on a first voice; a command processor that causes the specified command to be executed for a control target; a command determiner that determines whether or not the specified command is a repeated command; and an instruction determiner that determines whether or not a second voice, which corresponds to an execution instruction word indicating an instruction for executing the repeated command, has been received, after the repeated command corresponding to the first voice is executed, when the specified command is the repeated command, wherein when the second voice is received after the repeated command is executed, the command processor causes the repeated command to be repeatedly executed.

10 Claims, 7 Drawing Sheets

FIG. 3

COMMAND LIST INFORMATION (D1)

| CATEGORY | COMMAND NAME | CONTROL CONTENTS | REPEATABILITY | REVERSE COMMAND NAME |
|---|---|---|---|---|
| CATEGORY 1 | Undo | UNDO | OK | Redo |
| CATEGORY 1 | Redo | REDO | OK | Undo |
| CATEGORY 2 | Zoom in | ZOOM IN | OK | Zoom out |
| CATEGORY 2 | Zoom out | ZOOM OUT | OK | Zoom in |
| CATEGORY 3 | TURN PAGE | ADVANCE TO NEXT PAGE | OK | PAGE BACK |
| CATEGORY 3 | PAGE BACK | RETURN TO PREVIOUS PAGE | OK | TURN PAGE |
| CATEGORY 4 | Start presentation | START SLIDESHOW | NO | – |

FIG. 4

COMMAND HISTORY INFORMATION (D2)

| CATEGORY | COMMAND NAME | CONTROL CONTENTS |
|---|---|---|
| CATEGORY 4 | Launch app | LAUNCH APPLICATION |
| CATEGORY 2 | Zoom in | ZOOM IN |

FIG. 5

| INSTRUCTION WORD LIST INFORMATION ||
|---|---|
| WORD TYPE | INSTRUCTION WORD |
| EXECUTION INSTRUCTION | continue, more |
| EXECUTION INSTRUCTION | again, repeat |
| RETURN INSTRUCTION | return, back |
| STOP INSTRUCTION | wait, stop |
| STOP INSTRUCTION | finished, end |

D3

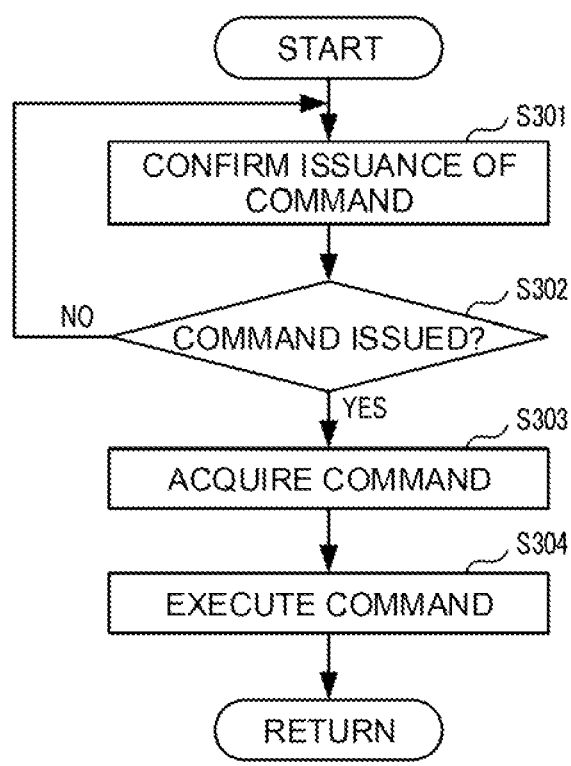

VOICE PROCESSING SYSTEM, VOICE PROCESSING METHOD, AND STORAGE MEDIUM STORING VOICE PROCESSING PROGRAM

INCORPORATION BY REFERENCE

The present application is based upon and claims the benefit of priority from the corresponding Japanese Patent Application No. 2020-043712 filed on Mar. 13, 2020, the entire contents of which are incorporated herein by reference.

This disclosure relates to a voice processing system, a voice processing method, and a storage medium that stores a voice processing program.

BACKGROUND

A voice processing device that recognizes a user's voice and executes information processing that accords to the voice has been proposed. For example, when the user wants to increase the volume of a device, the user speaks a preset specific word to a voice processor. When receiving the specific word, the voice processing device starts accepting commands that accords to information processing. After that, when the user speaks an instruction (command voice) such as "increase the volume", the voice processing device receives the command voice and executes a command to increase the volume.

In such a voice processing device, for example, there is proposed a technology in which when the command of the recognized voice is a predetermined repeated command which corresponds to the control to be repeatedly executed, the command is repeatedly executed without the user speaking the command voice each time.

However, in the conventional technology, when the user's voice is the repeated command, the command is repeated without receiving the user's instruction, so that the user's intention may not be properly reflected. For example, when the repeated command is a command which corresponds to the control for increasing the volume of a target device, the command is repeatedly executed and the volume is repeatedly increased. Therefore, for example, there will be a situation where when the user emits a command voice with the intention of executing the command only once, but the command is the repeated command, the volume continues to increase against the user's intention. In this way, with the conventional technology, it is difficult to repeatedly execute a predetermined command while appropriately reflecting the user's intention.

SUMMARY

It is an object of the present disclosure to provide a voice processing system, a voice processing method, and a storage medium capable of repeatedly executing a predetermined command while appropriately reflecting a user's intention.

A voice processing system according to a first aspect of the present disclosure comprises: a voice receiver that receives a voice emitted by a user; a command specifier that specifies a command based on a first voice received by the voice receiver; a command processor that causes the command, which is specified by the command specifier, to be executed for a control target; a command determiner that determines whether or not the command specified by the command specifier is a repeated command capable of being executed for the control target; and an instruction determiner that determines whether or not a second voice, which corresponds to an execution instruction word indicating an instruction for executing the repeated command, has been received by the voice receiver, after the repeated command corresponding to the first voice is executed by the command processor, when the command specified by the command specifier is the repeated command, wherein when the second voice is received by the voice receiver after the repeated command is executed, the command processor causes the repeated command to be repeatedly executed for the control target.

A voice processing method according to another aspect of the present disclosure is a voice processing method that executes operations by one or more processors, the operations comprising: receiving a voice emitted by a user; specifying a command based on a first voice received in the receiving of the voice; processing that causes the command, which is specified in the specifying, to be executed for a control target; determining whether or not the command specified in the specifying is a repeated command capable of being executed for the control target; and determining whether or not a second voice, which corresponds to an execution instruction word indicating an instruction for executing the repeated command, has been received in the receiving, after the repeated command corresponding to the first voice is executed in the processing when the command specified in the specifying is the repeated command, wherein when the second voice is received in the receiving after the repeated command is executed, the processing causes the repeated command to be repeatedly executed for the control target.

A storage medium according to still another aspect of the present disclosure is a storage medium storing a voice processing program that executes operations by one or more processors, the operations comprising: receiving a voice emitted by a user; specifying a command based on a first voice received in the receiving of the voice; processing that causes the command, which is specified in the specifying, to be executed for a control target; determining whether or not the command specified in the specifying is a repeated command capable of being executed for the control target; and determining whether or not a second voice, which corresponds to an execution instruction word indicating an instruction for executing the repeated command, has been received in the receiving, after the repeated command corresponding to the first voice is executed in the processing when the command specified in the specifying is the repeated command, wherein when the second voice is received in the receiving after the repeated command is executed, the processing causes the repeated command to be repeatedly executed for the control target.

According to the present disclosure, a voice processing system, a voice processing method, and a storage medium capable of repeatedly executing a predetermined command while appropriately reflecting a user's intention are provided.

This Summary is provided to introduce a selection of concepts in a simplified form that are further described below in the Detailed Description with reference where appropriate to the accompanying drawings. This Summary is not intended to specify key features or essential features of the claimed subject matter, nor is it intended to be used to limit the scope of the claimed subject matter. Further, the claimed subject matter is not limited to implementations that solve any or all disadvantages noted in any part of this disclosure.

BRIEF DESCRIPTION OF THE DRAWINGS

FIG. 3 is a diagram for showing an example of command list information used in the voice processing system according to the embodiment of the present disclosure.

FIG. 4 is a diagram for showing an example of command history information used in the voice processing system according to the embodiment of the present disclosure.

FIG. 5 is a diagram for showing an example of instruction word list information used in the voice processing system according to the embodiment of the present disclosure.

FIG. 8 is a flowchart for describing an example of a procedure of command execution processing executed in the voice processing system according to the embodiment of the present disclosure.

DETAILED DESCRIPTION

Hereinafter, an embodiment of the present disclosure will be described with reference to the accompanying drawings. Further, the following embodiment represents an example embodying the present disclosure, and does not limit the technical scope of the present disclosure.

A voice processing system according to the present disclosure is applicable to a case where one user uses a voice processing device and a user terminal, a case where a plurality of users have a conference by using the voice processing device and each user terminal at one base (area), and a case where multiple bases (areas) are connected to a network and multiple users have a remote conference by using the voice processing device and each user terminal of each base. The voice processing system according to the present invention has a function of executing a voice command issued by the user. In addition, the voice processing system may be provided with a call function (telephone function, television telephone function, etc.) capable of making a call between users via a network.

In the following embodiment, a case where one user uses a voice processing device and a user terminal will be described as an example. For example, in the voice processing system according to the present embodiment, the voice processing device and the user terminal are arranged in one base (conference room). Further, in the voice processing system, the voice processing device receives a voice emitted by the user, the voice processing device sends the voice to a cloud server, and the cloud server analyzes (voice recognition) the voice to specify the command. Then, the voice processing system causes the voice processing device to output a command response and causes the user terminal to execute the command.

Voice Processing System 100

Figure 1:
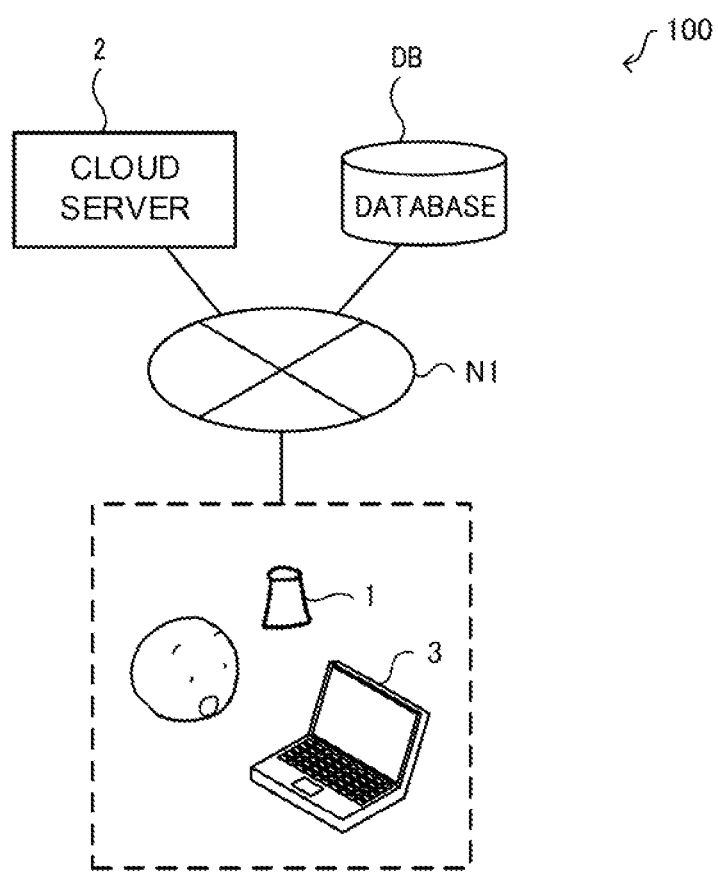
FIG. 1 is a diagram for showing a schematic configuration of a voice processing system according to an embodiment of the present disclosure.

FIG. 1 is a diagram for showing a schematic configuration of a voice processing system according to an embodiment of the present disclosure. A voice processing system 100 includes a voice processing device 1, a cloud server 2, a user terminal 3, and a database DB. The voice processing device 1 is a microphone speaker device including a microphone and a speaker, such as an AI speaker or a smart speaker. The voice processing device 1, the cloud server 2, the user terminal 3, and the database DB are connected to each other via a network N1. The network N1 is a communication network such as the Internet, a LAN, a WAN, or a public telephone line. The cloud server 2 is constructed by, for example, one or more data servers (virtual servers). The database DB stores various data. The database DB may be included in any of the voice processing device 1, the cloud server 2, and the user terminal 3, or may be provided in a manner to be distributed to a plurality of these devices.

Voice Processing Device 1

Figure 2:
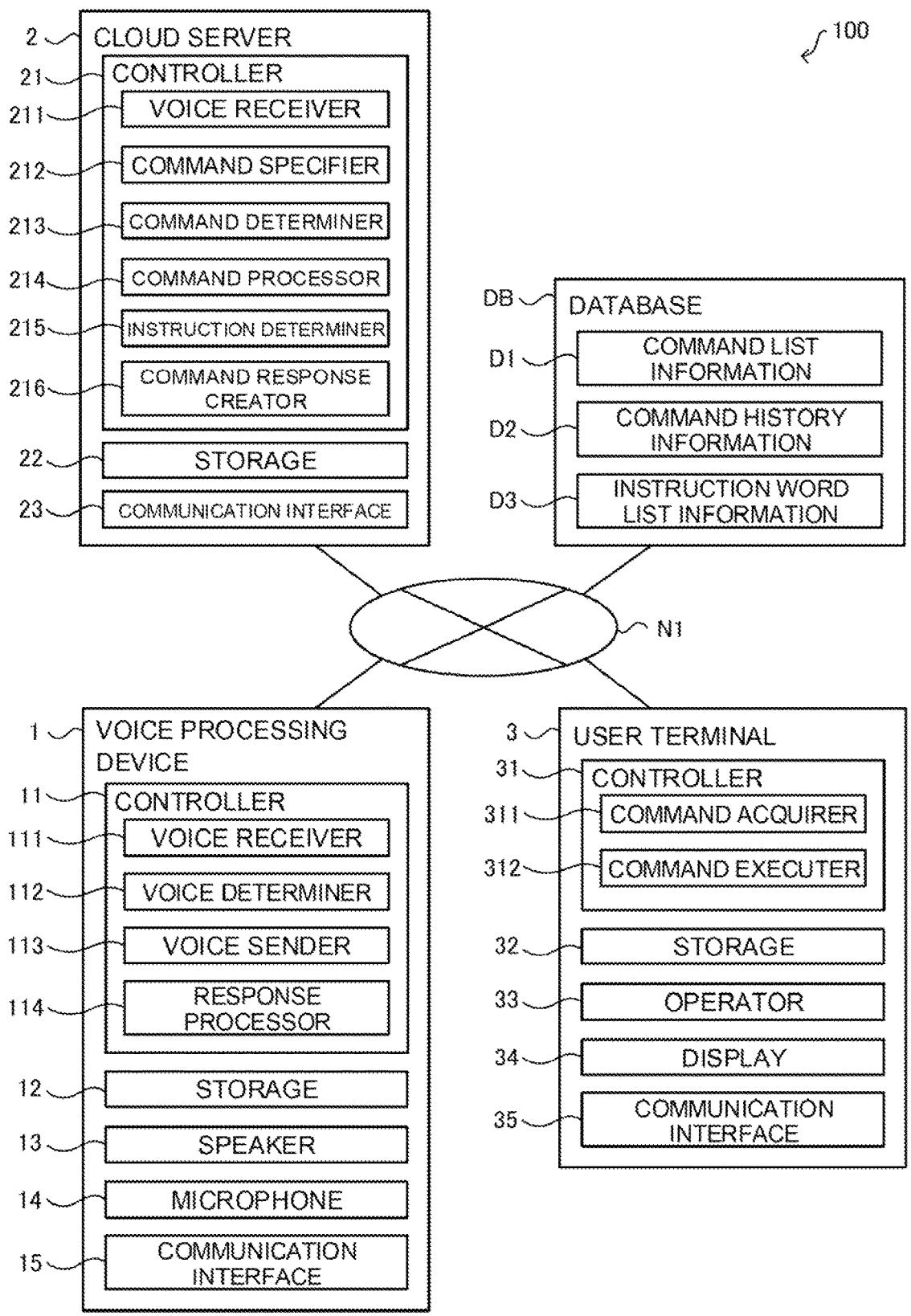
FIG. 2 is a functional block diagram for showing the configuration of the voice processing system according to the embodiment of the present disclosure.

As shown in FIG. 2, the voice processing device 1 includes a controller 11, a storage 12, a speaker 13, a microphone 14, a communication interface 15, and the like. The voice processing device 1 may be a device such as an AI speaker or a smart speaker. The voice processing device 1 is, for example, placed on a desk, and acquires the user's voice via the microphone 14, and outputs (reports) a voice (command response) to the user from the speaker 13.

A communication interface 15 is a communication interface that connects the voice processing device 1 to the wired or wireless network N1, and executes data communication, which accords to a predetermined communication protocol, with other devices (such as cloud server 2, user terminal 3, and database DB) via the network N1.

The storage 12 is a non-volatile storage such as a flash memory for storing various pieces of information. The storage 12 stores a control program such as a voice receiving program for causing the controller 11 to execute voice reception processing described below (see FIG. 6). The voice receiving program is delivered, for example, from the cloud server 2 and then stored. Further, the voice receiving program may be non-temporarily recorded in a computer-readable recording medium such as a CD or a DVD, and may be stored in the storage 12 after being read by a reading device (not shown) such as a CD drive or a DVD drive included in the voice processing device 1.

The controller 11 includes control devices such as a CPU, a ROM, and a RAM. The CPU is a processor that executes various arithmetic processes. The ROM stores in advance control programs such as a BIOS and an OS for causing the CPU to execute various processes. The RAM stores various pieces of information and is used as a temporary storage memory (work area) for the various processes executed by the CPU. Further, the controller 11 controls the voice processing device 1 by causing the CPU to execute the various control programs stored in advance in the ROM or the storage 12.

Specifically, the controller 11 includes various processors such as a voice receiver 111, a voice determiner 112, a voice sender 113, and a response processor 114. The controller 11 functions as various processors with the CPU executing the various processes that accord to the control programs. Further, a part or all of the processors included in the controller 11 may be configured by an electronic circuit. Further, the voice receiving program may also be a program for causing a plurality of processors to function as the various processors.

The voice receiver 111 receives a voice emitted by the user who is using the voice processing device 1. The user speaks, for example, the voice of a specific word (also called a start word or a wake-up word) for the voice processing device 1 to start accepting commands, the voice of various commands for instructing the voice processing device 1 (command voice), and the like. Further, the specific word may include a so-called skill indicating a function that the voice processing system 100 can provide.

The voice determiner 112 determines, on the basis of the voice received by the voice receiver 111, whether or not the specific word is included in the voice. For example, the voice determiner 112 executes voice recognition with respect to the voice received by the voice receiver 111, and converts the voice into text data. Then, the voice determiner 112 determines whether or not the specific word is included at the beginning of the text data.

The voice sender 113, on the basis of the determination result by the voice determiner 112, sends, to the cloud server 2, the voice received by the voice receiver 111. Specifically, when the voice determiner 112 determines that the specific word is included in the voice received by the voice receiver 111, the voice sender 113 sends, to the cloud server 2, voice data of a keyword (command keyword) that is included in the voice and follows the specific word, or text data which corresponds to the keyword. Further, when the voice determiner 112 determines that the specific word is not included in the voice received by the voice receiver 111, the voice sender 113 does not send the voice to the cloud server 2. With this, it is possible to prevent any voice, which does not include the specific word (for example, conversation voices), from being unnecessarily sent to the cloud server 2.

Further, when a preset voice (instruction voice) is received by the voice receiver 111, the voice sender 113 sends the instruction voice to the cloud server 2. The instruction voice is an execution instruction voice, a stop instruction voice, a return instruction voice, etc., which will be described below. These pieces of voice information may be registered in the storage 12 in advance. Further, the instruction voice may be included in the command voice. That is, when the user emits the instruction voice following the voice of the specific word, the voice sender 113 sends the instruction voice, as the command voice, to the cloud server 2.

The voice sender 113 may send, to the cloud server 2, all the voices received by the voice receiver 111.

The response processor 114 acquires, from the cloud server 2, a response (command response) which corresponds to the command specified by the cloud server 2, and outputs the command response from the speaker 13. For example, when the command is the content which relates to an information search, the response processor 114 acquires the search result from the cloud server 2, and outputs the search result from the speaker 13.

Cloud Server 2

As shown in FIG. 2, the cloud server 2 includes a controller 21, a storage 22, a communication interface 23, and the like.

The communication interface 23 is a communication interface that connects the cloud server 2 to the wired or wireless network N1, and executes data communication, which accords to a predetermined communication protocol, with other devices (such as voice processing device 1, user terminal 3, and database DB) via the network N1.

The storage 22 is a non-volatile storage such as a flash memory for storing various pieces of information. The storage 22 stores a control program such as a command control program for causing the controller 21 to execute a command control processing described below (see FIG. 7). For example, the command control program may be non-temporarily recorded in a computer-readable recording medium such as a CD or a DVD, and may be stored in the storage 22 after being read by a reading device (not shown) such as a CD drive or a DVD drive included in the cloud server 2. Further, the storage 22 stores the command voice, the instruction voice, and the like received from the voice processing device 1.

The controller 21 includes control devices such as a CPU, a ROM, and a RAM. The CPU is a processor that executes various arithmetic processes. The ROM stores in advance control programs such as a BIOS and an OS for causing the CPU to execute various processes. The RAM stores various pieces of information and is used as a temporary storage memory (work area) for the various processes executed by the CPU. Further, the controller 21 controls the cloud server 2 by causing the CPU to execute various control programs stored in advance in the ROM or the storage 22.

Moreover, the controller 21 executes the various processes by referring to the database DB. As shown in FIG. 2, the data such as command list information D1, command history information D2, and instruction word list information D3 are stored in the database DB.

FIG. 3 illustrates an example of the command list information D1. In the command list information D1, for each command, the corresponding pieces of information such as "category", "command name", "control content", "repeatability", and "reverse command name" are registered in association with each other. "Category" is information that indicates the type of the command. "Command name" is the name of the command. "Control content" represents the control content of the command.

For example, "Undo" command represents a control to return to the original state when a predetermined process is executed. "Redo" command represents a control to redo the same processing when a predetermined process is executed. "Zoom in" command represents a control to enlarge the display content displayed on the display 34 of the user terminal 3. "Zoom out" command represents a control to reduce the display content displayed on the display 34 of the user terminal 3. "Turn page" command represents a control to turn (advance) the page of the material displayed on the display 34 of the user terminal 3 to the next page. "Page back" command represents a control to turn (return) the page of the material displayed on the display 34 of the user terminal 3 to the previous page. "Start presentation" command represents a control to start the slide show on the user terminal 3.

"Repeatability" is identification information for indicating whether or not the command is a command that can be repeatedly executed. "Undo", "Redo", "Zoom in", "Zoom out", "Turn page", and "Page back" are commands that can be repeatedly executed, so "OK" is registered. On the other hand, "Start presentation" is a command that cannot be repeatedly executed, so "NO" is registered. Here, other commands that can be repeatedly executed include commands such as changing character fonts (size, color, line type, etc.), character search, and input switching.

"Reverse Command Name" is a command that represents the reverse control content of the control content of the corresponding command. For example, "Redo" is registered in the reverse command of the "Undo" command. "Zoom out" is registered in the reverse command of the "Zoom in" command. "Page back" is registered in the reverse command of the "Turn page" command. Various commands corresponding to the functions that the voice processing system 100 can provide are registered in the command list information D1. In addition, each piece of the information of the command list information D1 is set in advance, and is updated as appropriate. The command list information D1 is an example of a first storage of the present disclosure.

FIG. 4 illustrates an example of the command history information D2. In the command history information D2, execution history information (history information) of the command executed in the past is registered in the execution order. For example, in the command history information D2, for each command, corresponding pieces of information such as "category", "command name", and "control content" are registered in association with each other. In addition, the information of the command registered in the command history information D2 is registered in association with the command information registered in the command list information D1. The example shown in FIG. 4 shows that the command executed immediately before is "Zoom in". Each pieces of information of the command history information D2 is registered every time the command is executed. The command history information D2 is an example of a second storage of the present disclosure.

FIG. 5 shows an example of the instruction word list information D3. The instruction word list information D3 registers words corresponding to the instruction voice, such as a word that makes an instruction for execution of a repeated command for a control target (execution instruction word), a word that makes an instruction for returning the control target to the state before the execution of the repeated command (return instruction word), and a word for stopping the execution of the repeated command for the control target (execution stop word). The "word type" is information of any of execution instruction, return instruction, and stop instruction. A specific word (text information) corresponding to each word type is registered in the "Instruction Word". Each of the above instruction words includes a word that exactly matches the text corresponding to the voice, a word that is a synonym (same) or a synonym (similar) of the text, and the like. Each piece of information of the instruction word list information D3 is preset, and is updated as appropriate.

In addition, as another embodiment, a part or all of the information such as the command list information D1, the command history information D2, and the instruction word list information D3 may be stored in any of the voice processing device 1, the cloud server 2, and the user terminal 3, or may be distributed to and stored in these multiple devices. Further, in a still another embodiment, each piece of the information may be stored in a server which is accessible from the voice processing system 100. In this case, the voice processing system 100 may acquire each piece of the information from the server and then may execute each processing such as the command control processing (see FIG. 7) described below.

As shown in FIG. 2, the controller 21 includes various processors such as a voice receiver 211, a command specifier 212, a command determiner 213, a command processor 214, an instruction determiner 215, and a command response creator 216. Further, the controller 21 functions as various processors with the CPU executing various processes which accord to the control programs. Further, a part or all of the processors included in the controller 21 may be configured by an electronic circuit. Further, the control programs may be programs for causing a plurality of processors to function as the various processors.

The voice receiver 211 receives the voice data (command voice) sent from the voice processing device 1. The command voice (an example of a first voice of the present invention) is the voice of the keyword following the specific word included at the beginning of the voice received by the voice processing device 1. Specifically, when the voice processing device 1 detects the specific word and sends the command voice to the cloud server 2, the cloud server 2 receives the command voice. Further, the voice receiver 211 may receive, via the voice processing device 1, all the voices emitted by the user. The voice receiver 211 is an example of a voice receiver of the present disclosure.

The command specifier 212 voice-recognizes the command voice received by the voice receiver 211, and specifies a predetermined command. The command specifier 212 is an example of a command specifier of the present disclosure. For example, the command specifier 212 refers to the command list information D1 (see FIG. 3) stored in the database DB, and specifies the command which corresponds to the command voice. In the present embodiment, there is provided a configuration in which a plurality of command names are registered in advance in the command list information D1, and the command that matches the command voice is specified from within the command list information D1. However, the command specifying method is not limited to this. For example, on the basis of predetermined terms included in the command keyword recognizing the command voice as a voice, and the clauses and syntaxes of the command keyword as a whole, the command specifier 212 may specify the command by interpreting the meaning of the content of the user instruction. For example, the command specifier 212 may specify the command from the command keyword by using a known method such as morphological analysis, syntax analysis, semantic analysis, or machine learning.

The command determiner 213 determines whether or not the command specified by the command specifier 212 is a repeated command that can be repeatedly executed for the control target. Here, the control target refers to a device, a file, data, setting information, etc. for which the command is executed. For example, in the case of the "Turn page" command, the control target is the material displayed on the display 34 of the user terminal 3, and in the case of the "Zoom in" command, the control target is the display content of the display 34 of the user terminal 3.

Specifically, referring to the command list information D1, the command determiner 213 determines whether or not the command specified by the command specifier 212 is the repeated command. The command determiner 213 is an example of a command determiner of the present disclosure.

The command processor 214 causes the command, which is specified by the command specifier 212, to be executed for the control target. Specifically, in the command storage area (queue) which is disposed in the storage 22 and corresponds to the user terminal 3, the command processor 214 stores the information of the command specified by the command specifier 212. The data (command) stored in the queue is taken out by the user terminal 3 which corresponds to the queue, and the user terminal 3 executes the command. For example, when the command specified by the command specifier 212 is "Zoom in" which is a repeated command, the command processor 214 stores the "Zoom in" command information in the queue which corresponds to the user terminal 3. When the user terminal 3 acquires the command from the queue by polling processing, the user terminal 3 executes the command. For example, when the user terminal 3 executes the command, the display content of the display 34 is enlarged to a predetermined size (display magnification). The command processor 214 is an example of a command processor of the present disclosure.

When the command specified by the command specifier 212 is the repeated command, the instruction determiner 215 determines whether or not the voice receiver 211 has received an execution instruction voice (an example of a second voice of the present invention) which corresponds to the execution instruction word that instructs the execution of the repeated command, after the command voice is received. The instruction determiner 215 is an example of an instruction determiner of the present disclosure.

For example, when the command specifier 212 specifies the command "Zoom in" as a repeated command, the command processor 214 executes the command. After that, the instruction determiner 215 determines whether or not the voice receiver 211 has received the execution instruction voice which corresponds to the execution instruction word (see FIG. 5). For example, when the voice receiver 211 receives the "Zoom in" command voice and then receives the "Repeat" voice (execution instruction voice), the instruction determiner 215 determines that the voice receiver 211 has received the execution instruction voice which corresponds to the execution instruction word.

When the instruction determiner 215 determines that the voice receiver 211 has received the execution instruction voice which corresponds to the execution instruction word, that is, when the execution instruction voice is received after the command voice is received by the voice receiver 211, the command processor 214 causes the repeated command, which corresponds to the command voice, to be repeatedly executed for the control target. Specifically, the command processor 214 refers to the command history information D2, and causes the command, which corresponds to the repeated command, to be executed for the control target. For example, when the user emits a "Zoom in" voice (command voice), the command is executed, and then a "Repeat" voice (execution instruction voice) is emitted, the command processor 214 acquires the immediately preceding command ("Zoom in") registered in the command history information D2, and causes the acquired command to be repeatedly executed for the control target.

That is, for the control target, the command processor 214 causes the repeated command to be executed based on the command voice, and then causes the repeated command to be repeatedly executed based on the execution instruction voice. With this, the display content of the display 34 of the user terminal 3 is gradually enlarged. For example, the command processor 214 causes the repeated command to be repeatedly executed at a predetermined time interval. The time interval may be equal, or may increase with an elapse of time.

Here, when the execution instruction voice is received by the voice receiver 211 before the predetermined time has elapsed since the previous repeated command was executed, the command processor 214 may cause the repeated command to be repeatedly executed for the control target. For example, when the user emits the "Repeat" voice (execution instruction voice) within a predetermined time (for example, 5 seconds) since the "Zoom in" command issued by the user was executed, the command processor 214 causes the "Zoom in" command to be repeatedly executed. On the other hand, when the user emits the "Repeat" voice after an elapse of a predetermined time (for example, 5 seconds) since the "Zoom in" command issued by the user was executed, the command processor 214 does not cause the "Zoom in" command to be executed.

Further, when the repeated command is executed by the command processor 214, the instruction determiner 215 further determines whether or not the voice receiver 211 has received the stop instruction voice (an example of a third voice of the present invention) which corresponds to a stop instruction word that stops the execution of the repeated command after the execution instruction voice is received.

For example, when the command processor 214 executes the "Zoom in" repeated command, the instruction determiner 215 determines whether or not the voice receiver 211 has received the stop instruction voice which corresponds to the stop instruction word (see FIG. 5). For example, when the voice receiver 211 receives a "Stop" voice (stop instruction voice) after the command processor 214 executes "Zoom in", the instruction determiner 215 determines that the voice receiver 211 has received the stop instruction voice which corresponds to the stop instruction word.

When the instruction determiner 215 determines that the voice receiver 211 has received the stop instruction voice which corresponds to the stop instruction word, that is, when the stop instruction voice is received after the repeated command is executed, the command processor 214 stops the execution of the repeated command for the control target.

In this way, the command processor 214 causes the repeated command to be repeatedly executed for the control target from the time when the voice receiver 211 receives the execution instruction voice to the time when the voice receiver 211 receives the stop instruction voice, and stops the execution of the repeated command for the control target when the voice receiver 211 receives the stop instruction voice. In addition, during the time when the repeated command is being executed, the command processor 214 may inquire the user at a predetermined timing whether or not to continue executing the repeated command. The predetermined timing may be specified by the time interval, or by the number of times the command is executed. When the user emits the execution instruction voice in response to the inquiry, the command processor 214 causes the repeated command to be continuously executed, and when the user emits the stop instruction voice in response to the inquiry, the command processor 214 stops the repeated command.

Further, when the command processor 214 executes the repeated command, the instruction determiner 215 further determines, after the voice receiver 211 receives the command voice, whether or not the return instruction voice (an example of a fourth voice of the present disclosure) which corresponds to the return instruction word that makes an instruction to return the control target to the state before the execution of the repeated command is received.

For example, when the command processor 214 executes the "Zoom in" repeated command, the instruction determiner 215 determines whether or not the voice receiver 211 has received the return instruction voice which corresponds to the return instruction word (see FIG. 5). For example, when the voice receiver 211 receives a "Back" voice after the command processor 214 executes the "Zoom in", the instruction determiner 215 determines that the voice receiver 211 has received the return instruction voice which corresponds to the return instruction word.

When the instruction determiner 215 determines that the voice receiver 211 has received the return instruction voice which corresponds to the return instruction word, that is, when the return instruction voice is received after the repeated command is executed, the command processor 214 causes the reverse command (an example of a return command of the present disclosure) of the repeated command for the control target to be executed. For example, when the "Zoom in" repeated command is repeatedly executed three times and the display magnification is increased by three steps from the standard magnification, and then the return instruction voice is received, the command processor 214 executes the reverse command ("Zoom out") which lowers the display magnification by one step.

Further, when the command processor 214 causes the reverse command to be executed, and then the voice receiver 211 receives the execution instruction voice which corresponds to the execution instruction word (see FIG. 5), the command processor 214 may cause the reverse command to be repeatedly executed. In this case, the display magnification continues lowering until the user emits the stop instruction voice. In this way, based on the return instruction voice, the command processor 214 may cause a command to be executed for returning the control target to the immediately preceding state, or may cause the reverse command to be repeatedly executed for the control target.

Based on the determination result of the command determiner 213 or instruction determiner 215 and based on the command content executed by the command processor 214, the command response creator 216 creates a response text for responding to the user. For example, when the command determined by the command determiner 213 is the "Turn page" command, the command response creator 216 creates a response text such as "will execute 'turn page'" that combines the command name with the sentence "will execute . . . ". Further, when the instruction determiner 215 determines that the execution instruction voice has been received and the command processor 214 repeatedly executes the "Zoom in" command, the command response creator 216 creates a response text such as "will execute 'Zoom in' again" that combines the command name with the word "again" indicating the repetitive execution and the sentence "will execute . . . ". Further, when the instruction determiner 215 determines that the stop instruction voice has been received, the command response creator 216 creates a response text of "will stop . . . ". Further, when the instruction determiner 215 determines that the return instruction voice has been received, and the command processor 214 executes the reverse command "Zoom out", the command response creator 216 creates a response text such as "will execute 'Zoom out'" that combines the reverse command name with the sentence "will execute . . . ". From the speaker 13, the response processor 114 of the voice processing device 1 outputs the created response text by a voice.

User Terminal 3

As shown in FIG. 2, the user terminal 3 includes a controller 31, a storage 32, an operator 33, a display 34, a communication interface 35, and the like.

The operator 33 is a mouse, a keyboard, a touch panel, or the like, which receives user operations of the user terminal 3. The display 34 is a display panel such as a liquid crystal display or an organic EL display that displays various pieces of information. The operator 33 and the display 34 may also be a user interface which is integrally formed.

The communication interface 35 is a communication interface that connects the user terminal 3 to the wired or wireless network N1, and executes data communication, which accords to a predetermined communication protocol, with other devices (such as the voice processing device 1, the cloud server 2, and the database DB) via the network N1.

The storage 32 is a non-volatile storage such as a flash memory for storing various pieces of information. The storage 32 stores a control program such as a command execution program for causing the controller 31 to execute a command execution processing described below (see FIG. 8). For example, the command execution program may be non-temporarily recorded in a computer-readable recording medium such as a CD or a DVD, and may be stored in the storage 32 after being read by a reading device (not shown) such as a CD drive or a DVD drive included in the user terminal 3.

The controller 31 includes control devices such as a CPU, a ROM, and a RAM. The CPU is a processor that executes various arithmetic processes. The ROM stores in advance control programs such as a BIOS and an OS for causing the CPU to execute various processes. The RAM stores various pieces of information and is used as a temporary storage memory (work area) for the various processes executed by the CPU. Further, the controller 31 controls the user terminal 3 by causing the CPU to execute the various control programs stored in advance in the ROM or the storage 32.

Specifically, the controller 31 includes various processors such as a command acquirer 311 and a command executer 312. Further, the controller 31 functions as various processors with the CPU executing the various processes which accord to the control programs. Further, a part or all of the processors included in the controller 31 may be configured by an electronic circuit. Further, the control programs may be programs for causing a plurality of processors to function as the various processors.

The command acquirer 311 acquires a command which is stored in the command storage area (queue) (storage 22) of the cloud server 2. Specifically, for example, the command acquirer 311 monitors (polling) the queue which corresponds to the user terminal 3, and, when the command is stored in the queue, acquires the command. Further, the command processor 214 of the cloud server 2 may send data, which relates to the command, to the corresponding user terminal 3, and the command acquirer 311 may acquire the command.

The command executer 312 executes the command specified by the command specifier 212 of the cloud server 2. Specifically, the command executer 312 executes the command acquired by the command acquirer 311. For example, the command executer 312 executes the command stored in the queue acquired by the command acquirer 311.

For example, when a "Zoom in" repeated command is stored in the queue, the command acquirer 311 acquires the repeated command from the queue, and the command executer 312 executes the repeated command.

Here, when the cloud server 2 receives, from the voice processing device 1, the execution instruction voice which corresponds to the repeated command, the command processor 214 causes the queue to repeatedly store the repeated command. That is, the command processor 214 stores the repeated command in the queue each time the command acquirer 311 takes out the repeated command from the queue. With this, the repeated command is repeatedly executed on the user terminal 3.

Figure 6:
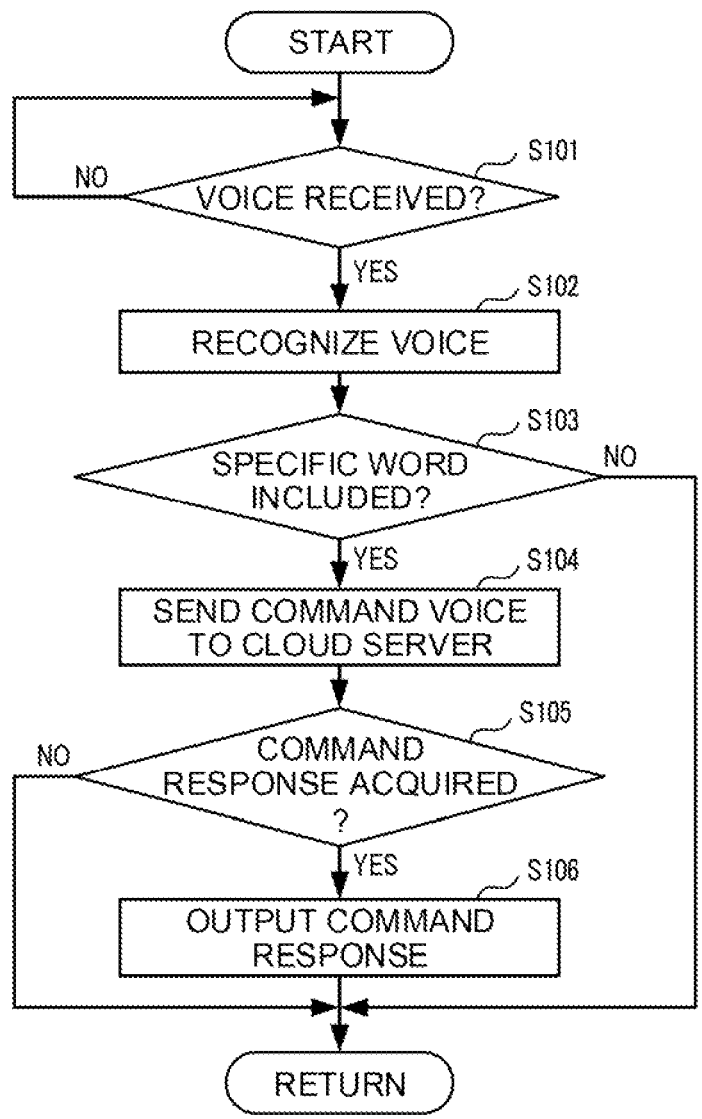
FIG. 6 is a flowchart for describing an example of a procedure of voice reception processing executed in the voice processing system according to the embodiment of the present disclosure.
Figure 7:
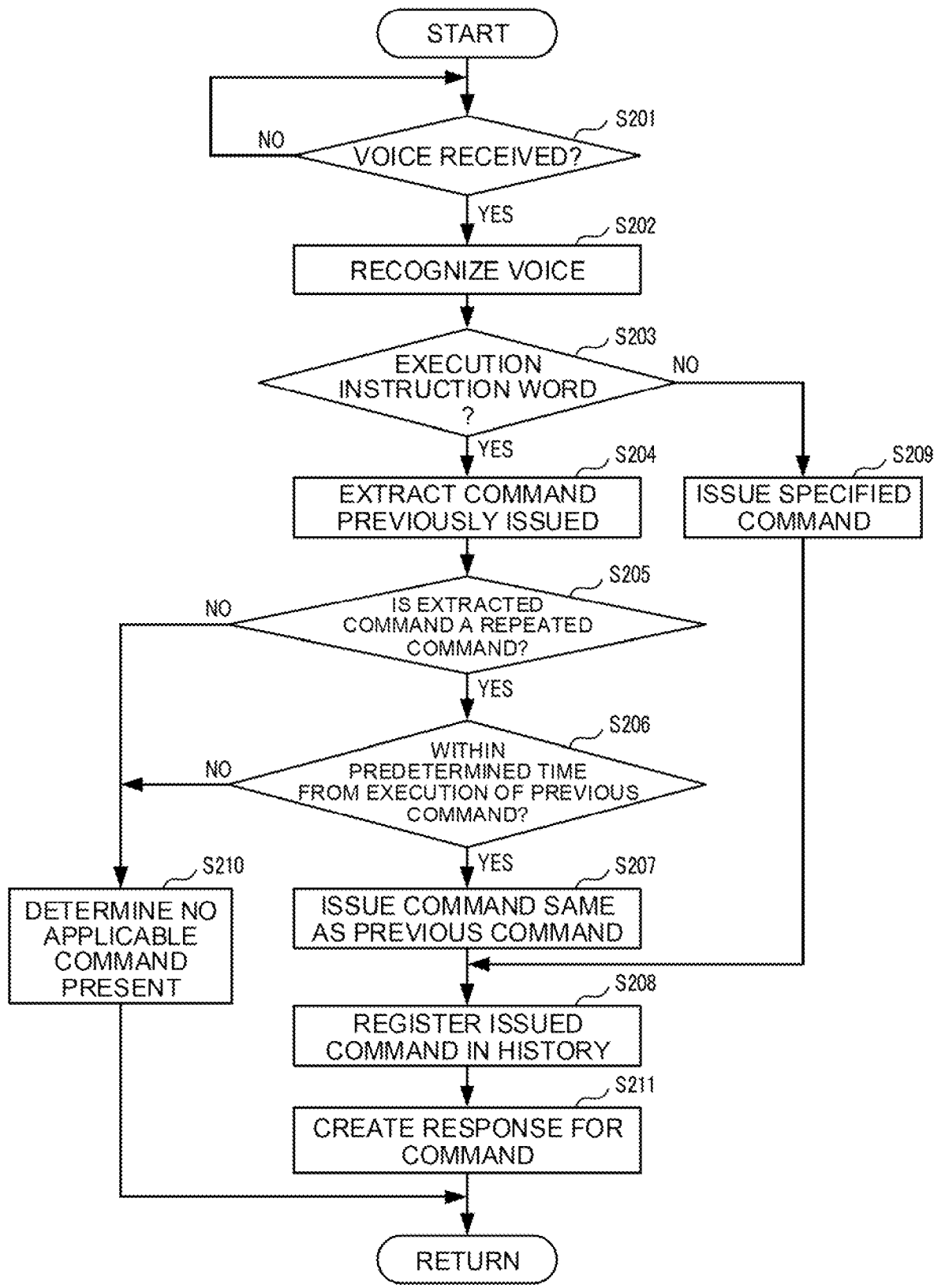
FIG. 7 is a flowchart for describing an example of a procedure of command control processing executed in the voice processing system according to the embodiment of the present disclosure.

Hereinafter, an example of a procedure of the voice processing executed by the controller 11 of the voice processing device 1, the controller 21 of the cloud server 2, and the controller 31 of the user terminal 3 will be described, with reference to FIG. 6 to FIG. 8. The voice processing includes the voice reception processing (see FIG. 6) executed by the controller 11 of the voice processing device 1, the command control processing (see FIG. 7) executed by the controller 21 of the cloud server 2, and the command execution processing (see FIG. 8) executed by the controller 31 of the user terminal 3.

Further, the present disclosure can be considered a disclosure of a voice processing method which executes one or more of the steps included in the voice processing. Further, one or more of the steps included in the voice processing described here may be appropriately omitted. Moreover, each of the steps in the voice processing may be executed in a different order as long as the same effect is obtained. In addition, a case where each of the steps in the voice processing is executed by the controllers 11, 21 and 31 will be described here as an example. However, in another embodiment, each of the steps in the voice processing may be executed in a distributed manner by one or more processors.

Voice Reception Processing

The voice reception processing executed by the controller 11 of the voice processing device 1 will be described, with reference to FIG. 6.

In step S101, the controller 11 determines whether or not any voice has been received from the user. When the controller 11 has received the voice from the user (S101: YES), the processing proceeds to step S102. The controller 11 waits until the voice is received from the user (S101: NO).

In step S102, the controller 11 recognizes the voice. Specifically, the controller 11 recognizes the voice and converts voice data into text data.

Next, in step S103, the controller 11 determines whether or not the specific word is included in the text data. When the controller 11 determines that the specific word is included in the text data (S103: YES), the processing proceeds to step S104. On the other hand, when the controller 11 determines that the specific word is not included in the text data (S103: NO), the processing returns to step S101.

In step S104, the controller 11 sends, to the cloud server 2, the command voice or the text data of the keyword (command keyword) that follows the specific word.

When the controller 21 of the cloud server 2 receives the command voice from the voice processing device 1 and outputs the command response to the voice processing device 1, the controller 11 acquires the command response (S105: YES), and outputs the command response (S106). For example, when the command voice is a search command, the controller 11 acquires the search result which corresponds to the command response, and outputs the search result from the speaker 13. Further, for example, when the command voice is the repeated command (for example, "Zoom in"), the controller 11 does not acquire the command response (S105: NO), and the processing returns to step S101.

Command Control Processing

The command control processing executed by the controller 21 of the cloud server 2 will be described, with reference to FIG. 7.

In step S201, the controller 21 determines whether or not the command voice or the instruction voice (execution instruction voice, stop instruction voice, return instruction voice) has been received from the voice processing device 1. When the controller 21 receives the command voice or the instruction voice from the voice processing device 1 (S201: YES), the processing moves to step S202. The controller 21 waits until receiving the command voice or the instruction voice from the voice processing device 1 (S201: NO). Step S201 is an example of voice receiving in the present disclosure.

In step S202, the controller 21 recognizes the command voice or the instruction voice. Further, specifically, the controller 21 recognizes the command voice by voice, refers to the command list information D1 (see FIG. 3), and specifies the command which corresponds to the command voice. In addition, the controller 21 recognizes the instruction voice by voice, refers to the instruction word list information D3 (see FIG. 5), and specifies the instruction word which corresponds to the instruction voice. Step S202 is an example of command specifying in the present disclosure.

Next, in step S203, the controller 21 determines whether or not the recognized voice is the execution instruction word. When the recognized voice is the execution instruction word (S203: YES), the processing moves to step S204. On the other hand, when the recognized voice is not the execution instruction word (S203: NO), that is, when the recognized voice is the command, the processing moves to step S209. Step S203 is an example of instruction determination in the present disclosure.

In step S209, the controller 21 issues the specified command. For example, when the controller 21 specifies the "Zoom in" command, the controller 21 stores the information of the command in the storage 22 (queue). After that, in step S208, the controller 21 registers the information of the issued command in the command history information D2 (see FIG. 4).

In step S204, the controller 21 refers to the command history information D2 (see FIG. 4), and extracts the command previously (immediately before) issued. For example, when "Zoom in" is registered as the previous command in the command history information D2, the controller 21 extracts the "Zoom in" command from the command history information D2.

Next, in step S205, the controller 21 determines whether or not the extracted command is the repeated command. When the extracted command is the repeated command (S205: YES), the processing moves to step S206. On the other hand, when the extracted command is not the repeated command (S205: NO), the processing moves to step S210. In step S210, the controller 21 determines that no applicable command (repeated command) is present, and the processing returns to step S201. Step S205 is an example of a command determination step of the present disclosure.

In step S206, the controller 21 determines whether or not the time from the execution of the previous repeated command to the present is within a predetermined time (for example, 5 seconds). When the time from the execution of the previous repeated command to the present is within the predetermined time (S206: YES), the processing moves to step S207. On the other hand, when the time from the execution of the previous repeated command to the present is not within the predetermined time (S206: NO), the processing moves to step S210.

In step S207, the controller 21 issues the same command as the previous repeated command. For example, the controller 21 stores the information of the "Zoom in" command in the storage 22 (queue). After that, in step S208, the controller 21 registers the information of the issued command in the command history information D2 (see FIG. 4). Step S207 is an example of a command processing step of the present disclosure.

In step S211, for the issued command, the controller 21 creates a response text that responds to the user. For example, the controller 21 creates a response text that combines the content of the issued command (command name or reverse command name) with "will execute . . . ". In addition, in the case of a command to be repeatedly executed, the controller 21 creates a response text that combines the command name with "again" and "will execute . . . ". In addition, when stopping the command, the controller 21 creates a response text that combines the command name with "will stop . . . ". The controller 21 sends the created response text to the voice processing device 1, and causes the speaker 13 of the voice processing device 1 to output the voice.

Further, when the voice recognized in step S202 is the stop instruction voice, the controller 21 deletes the command stored in the queue.

Further, when the voice recognized in step S202 is the return instruction voice, the controller 21 stores, in the queue, the information of the reverse command of the repeated command for the control target. Then, the controller 21, in step S208, registers the information of the issued reverse command in the command history information D2.

Command Execution Processing

The command execution processing executed by the controller 31 of the user terminal 3 will be described, with reference to FIG. 8.

In step S301, the controller 31 confirms the issuance of the command. Specifically, the controller 31, by the polling processing, confirms the command to be registered in the storage 22 (queue) of the cloud server 2.

In step S302, the controller 31 determines whether or not a command has been issued. When the command is stored in the queue (S302: YES), the processing moves to step S303. The controller 31 acquires the command from the queue (S303), and executes the command (S304).

For example, when the controller 31 executes the repeated command "Zoom in" and then the user emits a "Repeat" execution instruction voice, the controller 31 acquires the "Zoom in" command to be repeatedly stored in the queue, and repeatedly executes the "Zoom in" command.

The voice processing system 100 executes the voice processing in the manner described above. As described above, the voice processing system 100 according to the present embodiment repeatedly executes the repeated command, when the specified command is a repeated command and when the user's voice received after the execution of the repeated command is a voice which corresponds to the execution instruction word indicating an instruction for repeatedly executing the repeated command. In this way, in the case of the repeated command, the repeated command is executed on condition that the execution instruction word of the user is received. Therefore, it is possible to prevent a situation in which the repeated command is repeatedly executed against the user's intention. Therefore, according to the voice processing system 100, it is possible to repeatedly execute a predetermined command while appropriately reflecting the user's intention.

The present disclosure is not limited to the above embodiment. As another embodiment, for example, when receiving the execution instruction voice after a predetermined time has elapsed since the previous repeated command was executed, the command processor 214 may present, to the user, a plurality of execution histories stored in the command history information D2, and may cause the command, which corresponds to the execution history selected by the user among a plurality of execution histories, to be executed for the control target. For example, when the user emits a "Repeat" voice (execution instruction voice) within a predetermined time (for example, 5 seconds) after the "Zoom in" command issued by the user is executed, the command processor 214 causes the "Zoom in" command to be repeatedly executed. On the other hand, when the user emits the "Repeat" voice after the predetermined time (for example, 5 seconds) has elapsed since the "Zoom in" command issued by the user is executed, the command processor 214 presents, to the user, a plurality of execution histories stored in history information D2. Then, the command processor 214 causes the command, which corresponds to the execution history selected by the user among a plurality of execution histories, to be executed for the control target. With this, the user can re-execute not only the command executed immediately before but also the command executed before the above command.

The voice processing system of the present disclosure may be composed of the cloud server 2 alone, may be composed of the voice processing device 1 and the cloud server 2, or may be composed of the voice processing device 1, the cloud server 2, and the user terminal 3. In addition, the voice processing system may be composed of one or more physical servers, or may be composed of a virtual server (cloud server).

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

What is claimed is:

1. A voice processing system, comprising:
   a voice receiver that receives a voice emitted by a user;
   a command specifier that specifies a command based on a first voice received by the voice receiver;
   a command processor that causes the command, which is specified by the command specifier, to be executed for a control target;
   a command determiner that determines whether or not the command specified by the command specifier is a repeated command capable of being executed for the control target; and
   an instruction determiner that determines whether or not a second voice, which corresponds to an execution instruction word indicating an instruction for executing the repeated command, has been received by the voice receiver, after the repeated command corresponding to the first voice is executed by the command processor, when the command specified by the command specifier is the repeated command,
   wherein when the second voice is received by the voice receiver after the repeated command is executed, the command processor causes the repeated command to be repeatedly executed for the control target.

2. The voice processing system according to claim 1 wherein the command determiner refers to a first storage that stores information of the command and identification information as to whether or not the command is capable of being repeatedly executed, and determines whether or not the command specified by the command specifier is the repeated command.

3. The voice processing system according to claim 1 wherein the command processor refers to a second storage that stores an execution history of the command, and causes the command, which corresponds to the repeated command, to be executed for the control target.

4. The voice processing system according to claim 1 wherein, for the control target, the command processor causes the repeated command to be executed based on the first voice, and then causes the repeated command to be executed based on the second voice.

5. The voice processing system according to claim 1 wherein when receiving the second voice before a predetermined time has elapsed since a previous repeated command was executed, the command processor causes the repeated command to be repeatedly executed for the control target.

6. The voice processing system according to claim 1 wherein when receiving the second voice after a predetermined time has elapsed since a previous repeated command was executed, the command processor presents, to the user, a plurality of execution histories stored in a second storage that stores an execution history of the command, and causes the command, which corresponds to the execution history selected by the user among the plurality of execution histories, to be executed for the control target.

7. The voice processing system according to claim 1 wherein
when the repeated command is executed by the command processor, the instruction determiner further determines whether or not the voice receiver has received a third voice which corresponds to a stop instruction word that stops the execution of the repeated command after the second voice is received, and
the command processor causes the repeated command to be repeatedly executed for the control target from a time when the voice receiver receives the second voice to a time when the voice receiver receives the third voice.

8. The voice processing system according to claim 1 wherein
when the command processor executes the repeated command, the instruction determiner further determines, after the voice receiver receives the first voice, whether or not a fourth voice which corresponds to a return instruction word that makes an instruction to return the control target to a state before the execution of the repeated command is received, and
when the voice receiver receives the fourth voice, the command processor executes a return command that returns the control target to the state before the execution of the repeated command.

9. A voice processing method that executes operations by one or more processors, the operations comprising:
receiving a voice emitted by a user;
specifying a command based on a first voice received by the receiving of the voice;
processing that causes the command, which is specified in the specifying, to be executed for a control target;
determining whether or not the command specified in the specifying is a repeated command capable of being executed for the control target; and
determining whether or not a second voice, which corresponds to an execution instruction word indicating an instruction for executing the repeated command, has been received in the receiving, after the repeated command corresponding to the first voice is executed in the processing when the command specified in the specifying is the repeated command,
wherein when the second voice is received in the receiving after the repeated command is executed, the processing causes the repeated command to be repeatedly executed for the control target.

10. A non-transitory computer-readable recording medium storing a voice processing program that executes operations by one or more processors, the operations comprising:
receiving a voice emitted by a user;
specifying a command based on a first voice received by the receiving of the voice;
processing that causes the command, which is specified in the specifying, to be executed for a control target;
determining whether or not the command specified by the specifying is a repeated command capable of being executed for the control target; and
determining whether or not a second voice, which corresponds to an execution instruction word indicating an instruction for executing the repeated command, has been received in the receiving, after the repeated command corresponding to the first voice is executed in the processing when the command specified in the specifying is the repeated command,
wherein when the second voice is received in the receiving after the repeated command is executed, the processing causes the repeated command to be repeatedly executed for the control target.

* * * * *